United States Patent
Huntimer

(10) Patent No.: US 7,905,555 B2
(45) Date of Patent: Mar. 15, 2011

(54) YAW CONTROL SYSTEM FOR A VEHICLE-TRAILER COMBINATION

(75) Inventor: Todd M. Huntimer, Arlington, SD (US)

(73) Assignee: Global Polymer Industries, Inc., Arlington, SD (US)

( * ) Notice: Subject to any disclaimer, the term of this patent is extended or adjusted under 35 U.S.C. 154(b) by 728 days.

(21) Appl. No.: 11/840,068

(22) Filed: Aug. 16, 2007

(65) Prior Publication Data

US 2009/0045603 A1    Feb. 19, 2009

(51) Int. Cl.
*B60T 13/00* (2006.01)

(52) U.S. Cl. .................. 303/7; 188/112 A; 188/112 R; 188/3 R; 280/455.1; 280/432; 340/431

(58) Field of Classification Search .............. 188/112 A, 188/112 R, 3 R; 303/7; 280/455.1, 432, 280/446.1, 457, 511; 340/431

See application file for complete search history.

(56) References Cited

U.S. PATENT DOCUMENTS

| | | | | |
|---|---|---|---|---|
| 2,797,406 A * | 6/1957 | Ulysses et al. | ................. | 340/431 |
| 3,297,340 A * | 1/1967 | Rendessy | ...................... | 280/432 |
| 3,507,517 A * | 4/1970 | Eagle | ............................. | 280/432 |
| 3,588,809 A * | 6/1971 | Devlin | ............................ | 340/431 |
| 3,740,102 A | 6/1973 | Schwerin | | |
| 3,810,521 A | 5/1974 | Sparr | | |
| 3,833,928 A * | 9/1974 | Gavit et al. | ..................... | 340/431 |
| 3,856,329 A * | 12/1974 | Ordorica | ........................ | 280/432 |
| 3,861,489 A | 1/1975 | Lang et al. | | |
| 3,881,577 A | 5/1975 | Wherry et al. | | |
| 3,948,544 A * | 4/1976 | Presley et al. | ............... | 280/455.1 |
| 3,972,542 A * | 8/1976 | Dirks et al. | ................... | 280/432 |
| 3,972,543 A * | 8/1976 | Presley et al. | ............... | 280/455.1 |
| 4,040,006 A * | 8/1977 | Kimmel | ......................... | 340/431 |
| 4,040,507 A | 8/1977 | Reise | | |
| 4,120,514 A * | 10/1978 | Sanders | ......................... | 280/432 |
| 4,122,390 A * | 10/1978 | Kollitz et al. | ............. | 340/870.38 |
| 4,223,767 A | 9/1980 | Powell | | |
| 4,254,998 A | 3/1981 | Marshall et al. | | |
| 4,934,727 A * | 6/1990 | Hawkins et al. | ............... | 280/432 |
| 5,135,248 A * | 8/1992 | Keiserman | ..................... | 280/432 |
| 5,558,350 A * | 9/1996 | Kimbrough et al. | .......... | 280/426 |
| 5,558,351 A * | 9/1996 | Hunter | ........................... | 280/432 |
| 6,042,196 A | 3/2000 | Nakamura et al. | | |
| 6,268,800 B1 * | 7/2001 | Howard | ...................... | 340/686.1 |
| 6,688,631 B1 | 2/2004 | Andre | | |
| 6,956,468 B2 | 10/2005 | Lee et al. | | |
| 7,648,153 B2 * | 1/2010 | Metternich et al. | ........... | 280/433 |
| 2004/0222880 A1 | 11/2004 | Lee et al. | | |
| 2004/0249547 A1 | 12/2004 | Nenninger | | |
| 2007/0145809 A1* | 6/2007 | Timoney et al. | ............. | 298/22 P |

FOREIGN PATENT DOCUMENTS

GB    2409712    7/2005

* cited by examiner

*Primary Examiner* — Robert A Siconolfi
*Assistant Examiner* — Mariano Sy
(74) *Attorney, Agent, or Firm* — Black Lowe & Graham PLLC

(57) ABSTRACT

A yaw control system capable of detecting a predetermined yaw angle of a towed vehicle and then automatically communicating with a braking system of the towed vehicle includes an actuator and a switch. The actuator and switch operate to detect when a towed vehicle, such as a trailer, has exceeded a predetermined yaw angle. In one embodiment, the yaw control system includes a switch arranged to contact a surface of a plate (i.e., actuator) when the towed vehicle exceeds the predetermined yaw angle. In another embodiment, the yaw control system includes a switch mechanism arranged to contact retractable rods (i.e., actuator) coupled to a hitch assembly when the towed vehicle exceeds the predetermined yaw angle.

23 Claims, 4 Drawing Sheets

YAW CONTROL SYSTEM FOR A VEHICLE-TRAILER COMBINATION

FIELD OF THE INVENTION

The present invention relates generally to a yaw control system for a vehicle-trailer combination, such as a trailer towed behind a vehicle.

BACKGROUND OF THE INVENTION

The risks and dangers associated with yawing trailers during descent at certain speeds and other driving conditions are well-known. Some conditions may even cause the trailer to tip or shift sideways or cause the yawing or swaying motion of the trailer to become uncontrollably divergent, which may result in the trailer becoming "jackknifed".

Some devices exist for limiting the yawing motion of the trailer, such as telescoping lateral arms with damping effects. These arms are attached along the coupling on either side with a ball and socket connection at one extremity on the rear of the vehicle, and are attached to the coupling with a ball and socket connection at the other extremity. Another device is a flexible curvilinear damping mechanism as described in U.S. Pat. No. 6,688,631 to Andre. One drawback of these devices is that they are continually active, require routine maintenance, and tend to wear out and need to be replaced long before the operational lives of the vehicle-trailer and/or the hitch assembly have expired.

There have also been passive devices and systems for at least detecting a swaying motion of the trailer in a vehicle-trailer combination, many of which involve a non-contact means such as camera, ultra sound device, radar, laser, inertial, and/or magnetic sway sensors. One type of inertial sensor is a mercury sensor mounted in the towing vehicle as described in U.S. Pat. No. 4,254,998. One type of magnetic sway sensor mounted on the trailer or towed vehicle is described in U.S. Pat. No. 3,810,521. Because hitch mechanisms are exposed to weather, road debris, and other harsh aspects of the environment, these passive type devices and systems may typically lack robustness, which in turn necessitates frequent maintenance and replacement. In addition, these passive type devices and systems are often quite expensive or technically complex both in terms of construction and installation.

Many of the foregoing devices and systems attempt to measure the dynamic hitch or sway angle of the trailer to regulate vehicle dynamics. Some of these systems propose methods of evaluating the dynamic hitch or sway angle with a type of trailer motion control algorithm in an attempt to control the vehicle-trailer stability and ultimately to prevent jackknifing.

It would be desirable to have a device or system for detecting a yaw angle of the trailer relative to the vehicle while overcoming some of the aforementioned drawbacks. It is further desirable that the device or system for detecting the yaw angle of the trailer be more robust, easy to install on an existing hitch assembly, and relatively less expensive.

SUMMARY OF THE INVENTION

According to at least one embodiment of the invention, a yaw control system for detecting or sensing a maximum yaw displacement of a towed vehicle with respect to a towing vehicle includes an actuator and a switch. The actuator is spatially and geometrically arranged relative to the switch such that when the towed vehicle exceeds a maximum or predetermined yaw angle, the yaw control system automatically operates to decelerate the towed vehicle at a desired deceleration rate.

In one aspect of the invention, a yaw control system for a towing combination includes a towing vehicle and a towed vehicle, includes a first brake system configured to decelerate the towed vehicle, such as a trailer. Preferably, the first brake system is independently operable from a second brake system configured to decelerate a towing vehicle. The yaw control system further includes an actuator and a switch mounted to respective hitching assemblies of the towing combination. The switch is coupled to the towing combination in a spatial proximity to the actuator and the switch is in communication with the first brake system. When the switch is actuated or activated by the actuator, the switch provides a signal to the first brake system to decelerate the towed vehicle. The actuator is configured to activate the switch when the towed vehicle exceeds a maximum yaw angle relative to the towing vehicle. Preferably, the deceleration of the towed vehicle is accomplished at a desired deceleration rate.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

In the following description, certain specific details are set forth in order to provide a thorough understanding of various embodiments of the invention. In other instances, well-known structures and methods associated with hitch or hauling assemblies and systems, to include a towing vehicle, such as a truck, and a towed vehicle, such as a trailer, may not be shown or described in detail to avoid unnecessarily obscuring descriptions of the embodiments of the invention.

The following description relates generally to a yaw control system capable of detecting a predetermined yaw angle of a towed vehicle and then automatically communicating with a braking system of the towed vehicle. The yaw control system includes at least an actuator and a switch. The actuator and switch operate to detect when a towed vehicle, such as a trailer, has exceeded a predetermined yaw angle. In one embodiment, the yaw control system includes a switch arranged to contact a surface of a plate (i.e., actuator) when the towed vehicle exceeds the predetermined yaw angle. In another embodiment, the yaw control system includes a switch mechanism arranged to contact retractable rods (i.e., actuator) coupled to a hitch assembly when the towed vehicle exceeds the predetermined yaw angle.

Figure 1:
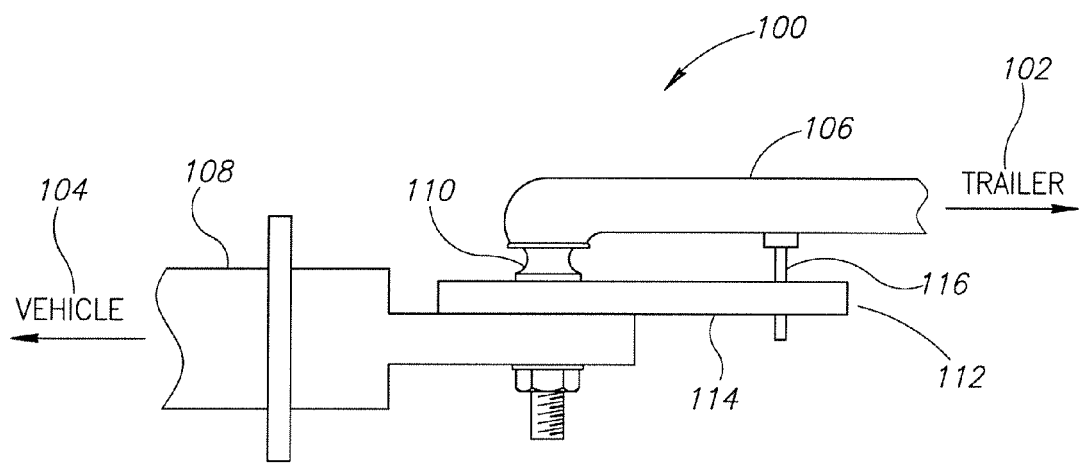
FIG. 1 is a side-elevational view of a vehicle-trailer combination having respective hitch assemblies and a yaw detection system mounted thereon according to an embodiment of the invention.

FIG. 1 shows a vehicle-trailer combination 100 with a trailer 102 and a vehicle 104. The trailer 102 includes a trailer hitch assembly 106 and the vehicle 104 includes a vehicle hitch assembly 108. In the illustrated embodiment, the trailer hitch assembly 106 is coupled to the vehicle hitch assembly 108 with a ball 110. Using the ball 110 to couple the hitch assemblies 106, 108 is well known in the art and will not be described in further detail. For purposes of this description, the vehicle 104 may be any type of vehicle capable of towing the trailer 102, for example a truck, recreational vehicle, automobile, etc. Further, the trailer 102 may be any type of vehicle capable of being towed, for example a camper, a utility trailer, a recreational vehicle, etc.

In a preferred embodiment, a yaw detection system 112 includes an actuator 114 and a switch 116. In the illustrated embodiment, the actuator 114 takes the form of a plate 114, which is mounted to the vehicle hitch assembly 108, and in particular is mounted under the ball 110. By way of example, the actuator 114 may be a ¼" thick plate mounted under the ball 110. The switch 116 is mounted to the trailer hitch assembly 106 and cooperates with the plate 114 to detect a yaw displacement of the trailer 102 with respect to the vehicle 104.

Figure 2A:
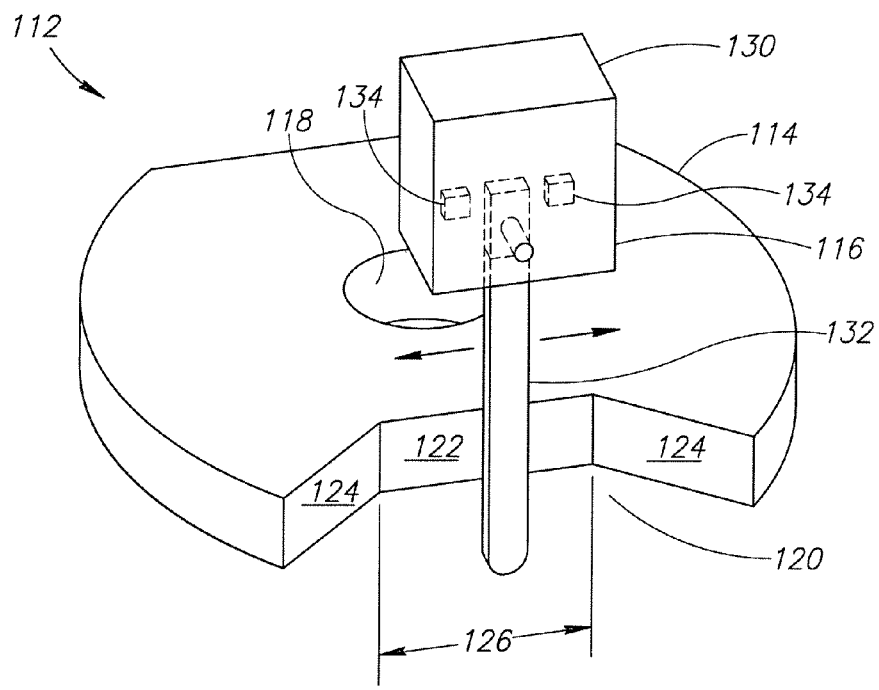
FIG. 2A is an isometric view of the yaw detection system of FIG. 1 having an actuator and a switch.
Figure 2B:
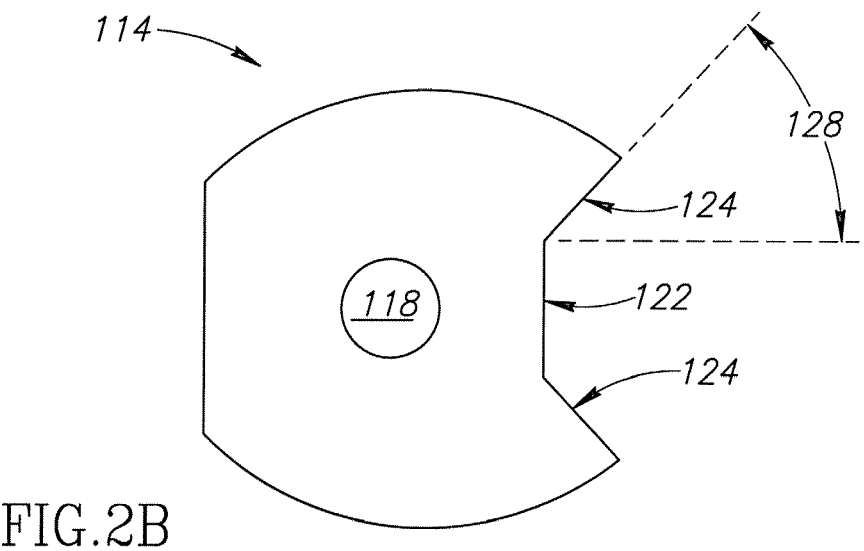
FIG. 2B is a top, plan view of the actuator of the yaw detection system of FIG. 2A.

FIG. 2A shows the yaw detection system 112 according to an illustrated embodiment. The actuator 114 includes an opening 118 to receive a threaded stem (not shown) extending from the ball 110 (FIG. 1). In addition, the actuator 114 includes a cutout region 120 defined by a first wall face 122 and side wall faces 124. The side wall faces 124 are in a spaced apart relationship with one another by a length 126 of the first wall face 122. In addition and as best shown in FIG. 2B, the side wall faces 124 may extend at a non-parallel and at a non-perpendicular angle 128 from the first wall face 122. Thus, the length 126 of the first wall face 122 in combination with the angle 128 of the side wall faces 124 provides an angular limit or yaw angle 208 (FIG. 4) over which the actuator 114 may move relative to the switch 116, or alternatively stated an angular limit or yaw angle 208 (FIG. 4) over which the trailer 102 may move relative to the vehicle 104 before the switch 116 contacts one of the side wall faces 124.

The switch 116 may be a contact switch having a contact mechanism 130 that cooperates with a lever 132. The contact mechanism 130 includes contacts 134 that make a circuit when the lever 132 makes contact with one or the other contact 134. In one embodiment, the switch 116 is a single pole, double throw (SPDT) switch, or otherwise commonly referred to as a three way switch.

Figure 3A:
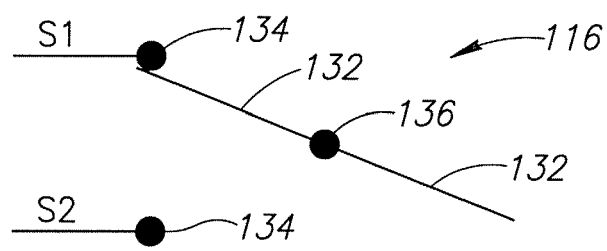
FIG. 3A is a schematic view of one type of contact switch according to an embodiment of the invention.

FIG. 3A shows an example of an SPDT or three-way switch making a circuit. The SPDT switch 116 includes the lever 132 that rotates about a fulcrum 136 to make contact with one of the two contacts 134. Upon making contact, a signal S1 or S2 may be transmitted to a trailer braking system, which will be described in further detail below.

Figure 3B:
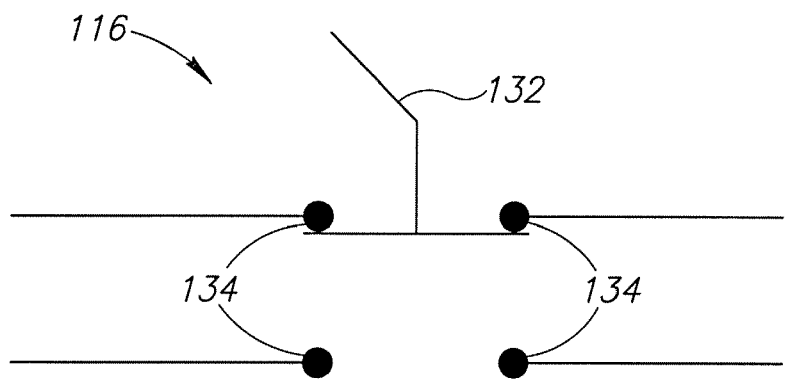
FIG. 3B is a schematic view of another type of contact switch according to another embodiment of the invention.

FIG. 3B shows an example of another type of mechanical switch 116 referred to as a selector switch 116, which includes a lever 132 moveable between contacts 134. It is appreciated that the illustrated switches are merely examples of switches that may be used with the actuator 114. In other embodiments, the switch may be electro-mechanical, electrical, optical-electrical, optical, magnetic, etc. One example of an optical switch is a proximity switch that utilizes a light emitting diode (LED) in combination with a sensor array to detect the proximity of the sidewall faces 124 of the actuator 114.

Figure 4:
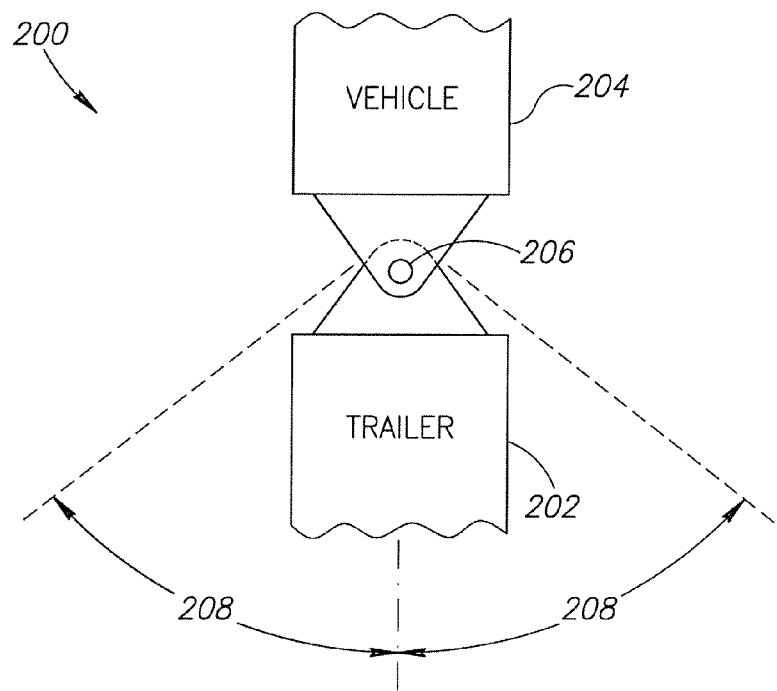
FIG. 4 is a schematic view of a vehicle-trailer combination showing a sway or yaw angle of the trailer relative to the vehicle according to an embodiment of the invention.

FIG. 4 shows another embodiment of a vehicle-trailer combination 200 having a trailer 202 towed by a vehicle 204. The trailer 202 is hitched to the vehicle 204 via commonly known hitch assemblies. During travel, the trailer 202 may and does often rotate relative to the vehicle 204 at a hitch pivot 206. Depending on the type of vehicle 204, the type of trailer 202, the relative weights, and a number of other parameters, a maximum yaw angle 208 may be determined for the trailer 202. In one embodiment, the maximum yaw angle 208 may be the angle over which the dynamic motion of the trailer 202 becomes divergent or uncontrollable, which may lead to jack-knifing of the trailer 202 or other types of catastrophic failures such as tipping or rolling of the trailer 202. The yaw angle 208 is generally understood to be the angle or amount of rotation, to the right or left, relative to a direction of travel of the vehicle. In addition, the yaw angle 208 may be defined as the motion about a vertical axis of a vehicle.

Figure 5:
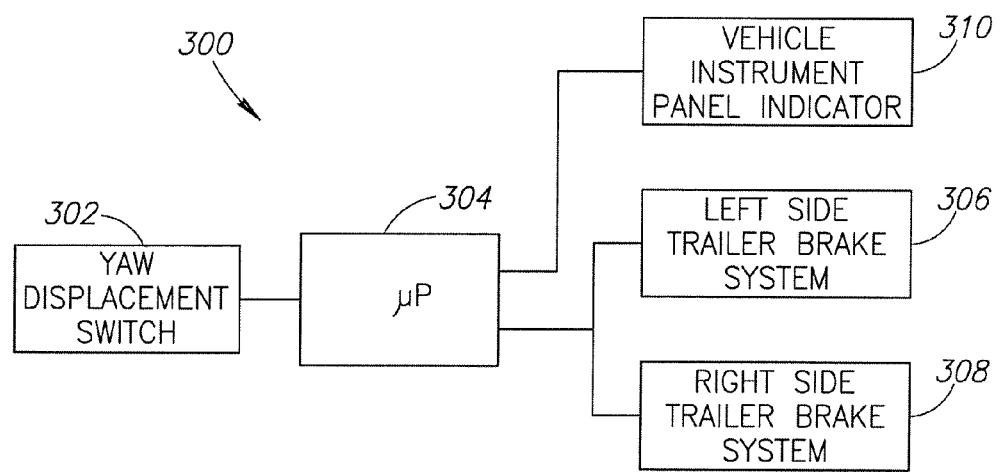
FIG. 5 is a block diagram of a yaw detection and braking system according to an embodiment of the invention.

FIG. 5 shows a system 300 for achieving controlled braking of a towed vehicle when the towed vehicle exceeds a predetermined yaw angle as discussed above. In one embodiment, the system 200 includes a yaw displacement switch 302 in communication with a microprocessor 304. Upon receiving a signal from the switch 302, the microprocessor 304 provides braking information to a left side towed vehicle braking system 306, a right side towed vehicle braking system 308, or both systems 306, 308 simultaneously. In one embodiment, the braking systems 306, 308 are instructed to apply a constant braking pressure and thus decelerate the left and right wheels of the towed vehicle at the same or at a substantially similar rate. In another embodiment, the braking systems 306, 308 are instructed to apply a differential braking pressure dependent on whether the towed vehicle has yawed or swayed right or left relative to the towing vehicle. In addition, the system 300 may further include a vehicle instrument panel indictor 310 to provide at least a visual indication to a driver of the towing vehicle that the towed vehicle has exceeded a maximum yaw angle.

Figure 6:
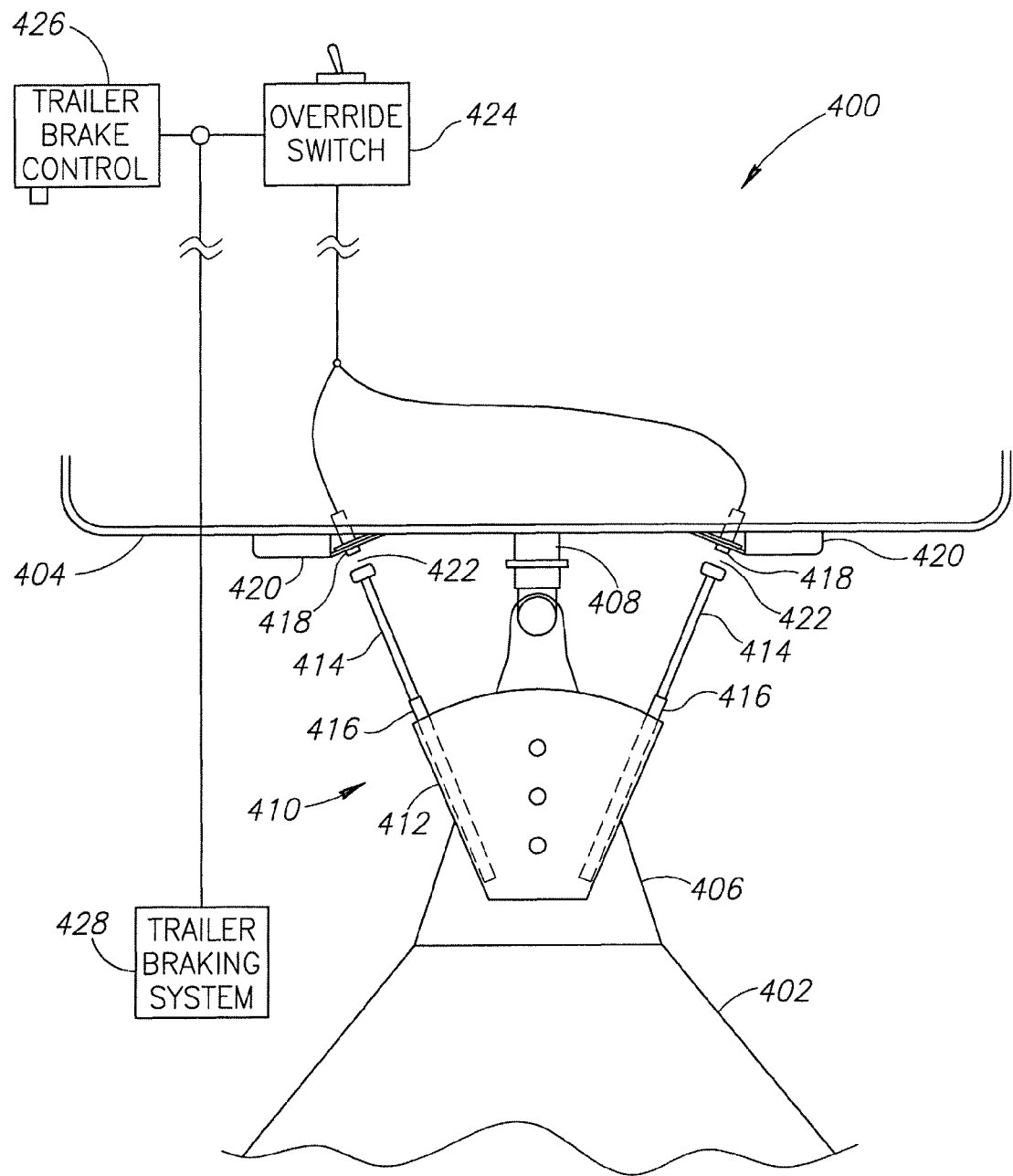
FIG. 6 is a top, plan view of a vehicle-trailer combination having respective hitch assemblies and a yaw detection system mounted thereon according to another embodiment of the invention.

FIG. 6 schematically shows a vehicle-trailer combination 400 according to another embodiment of the invention. The vehicle-trailer combination 400 includes a trailer 402 and a vehicle 404 with respective hitch assemblies 406, 408. In the illustrated embodiment, an actuator 410 is mounted to the trailer hitch assembly 406. The actuator 410 includes a bracket 412 and retractable rods 414 extending from the bracket 412 toward the vehicle 404. The retractable rods 414 may by cylinders 416 coupled to the bracket 412. In one embodiment, the retractable rods 414 and cylinders 416 take the form of retractable shock-absorbers.

The retractable rods 414 are spaced apart from the switches 418 mounted on the vehicle 404. The switches 416 are supported by structural mounts 420 coupled to the vehicle 404. In addition, the structural mounts 420 are configured such that the switches 416 are respectively aligned with the retractable rods 414. In operation and as the trailer 402 yaws relative to the vehicle 404, the retractable rods 414 may contact the switches 418 if the trailer exceeds a predetermined yaw angle 208 (FIG. 4). In the illustrated embodiment, a gap 422 between the rods 414 and the switches 418 may be used to calibrate the predetermined yaw angle 208. Hence, the larger the gap 422, the greater the maximum yaw angle permitted before the switch 418 is activated by the rod 414.

One advantageous feature of the vehicle-trailer combination 400 is that the switches 418 may be electronically coupled to an override switch 424. The override switch 424 may simply be an OPEN-CLOSED type of switch that when open, permits the switches 418 to communicate with a trailer brake controller 426, which in turn communicates with a trailer braking system 428, which is illustrated schematically in FIG. 6. As discussed above, the trailer braking system 428 operates to decelerate the trailer 402. When the override switch 424 is closed, the switches 418 are unable to communicate with at least the trailer braking system 428 and may further be unable to communicate with the trailer brake controller 426.

These and other changes can be made in light of the above detailed description. All of the above U.S. patents, patent applications and publications referred to in this specification as well as U.S. Pat. Nos. 6,688,631; 4,254,998; and 3,810,521 are incorporated herein by reference. In general, in the following claims, the terms used should not be construed to limit the invention to the specific embodiments disclosed in the specification and the claims, but should be construed to include all types of towing-towed vehicle combinations and hitching assemblies thereof, to include but not limited to ball-hitch assemblies that operate in accordance with the claims.

While the preferred embodiments of the invention have been illustrated and described, as noted above, many changes can be made without departing from the spirit and scope of the invention. For example, other types of switches and actuators with varying geometrical and spatial arrangements may be configured to achieve similar objectives and advantages as described above. Accordingly, the scope of the invention is not limited by the disclosure of the preferred embodiment. Instead, the invention should be determined by reference to the claims that follow.

The invention claimed is:

1. A yaw control system for a towing combination that includes a towing vehicle and a towed vehicle, the yaw control system comprising:
    a first brake system configured to decelerate the towed vehicle;
    an actuator coupled to the towing combination, the actuator having at least two structural faces spatially separated by a yaw distance defined by a yaw angle; and
    a switch coupled to the towing combination and positioned between the structural faces of the actuator, the switch operable to communicate with the first brake system to decelerate the towed vehicle once the switch has moved by a desired amount relative to at least one of the structural faces.

2. The yaw control system of claim 1, wherein the switch is a contact switch.

3. The yaw control system of claim 1, wherein the switch is a proximity switch.

4. The yaw control system of claim 1, wherein the actuator is a plate having a cutout region defined by the faces such that contact between one of the faces and the switch activates the switch.

5. The yaw control system of claim 1, wherein the actuator is coupled to the towed vehicle and rotates with the towed vehicle to contact the switch when the towed vehicle exceeds the maximum yaw angle.

6. The hitch system of claim 1, wherein the actuator is a retractable rod spaced apart from the switch by a predetermined distance.

7. The yaw control system of claim 6, wherein the predetermined distance between the retractable rod and the switch corresponds to the maximum yaw angle.

8. The yaw control system of claim 6, wherein the retractable rod is a shock absorbing rod mechanically coupled to the towed vehicle.

9. The yaw control system of claim 1, further comprising an override switch for manually deactivating the yaw control system.

10. The yaw control system of claim 1, wherein the first brake system operates independently from a second brake system configured to decelerate the towing vehicle.

11. A hitch system for a towing combination that includes a towing vehicle and a towed vehicle, the hitch system comprising:
    a first hitch assembly coupled to the towing vehicle;
    a second hitch assembly coupled to the towed vehicle;
    a coupling member for coupling the first hitch assembly to the second hitch assembly such that the towed vehicle is towable by the towing vehicle;
    a first brake system configured to decelerate the towed vehicle;
    an actuator coupled to and rotatable with the towed vehicle, the actuator having at least two structural faces spatially separated by a yaw distance defined by a yaw angle; and
    a switch coupled to the towing vehicle and positioned between the structural faces of, the switch operable to communicate with the first brake system to decelerate the towed vehicle when the actuator activates the switch, wherein actuation occurs when the towed vehicle exceeds a maximum yaw angle relative to the towing vehicle.

12. The hitch system of claim 11, wherein the switch is a contact switch.

13. The hitch system of claim 11, wherein the switch is a proximity switch.

14. The hitch system of claim 11, wherein the actuator is a plate having a cutout region defined by faces such that contact between one of the faces and the switch activates the switch.

15. The hitch system of claim 11, wherein the actuator is a retractable rod spaced apart from the switch by a predetermined distance.

16. A method of controlling a towed vehicle relative to a towing vehicle, the method:
    activating a switch with an actuator, the switch mounted to the towing vehicle and the actuator mounted to the towed vehicle, the actuator having at least two structural faces spatially separated by a yaw distance defined by a yaw angle, at least a portion of the switch positioned between the structural faces, wherein the actuator rotates with the towed vehicle and actuates the switch when the towed vehicle exceeds a maximum yaw angle relative to the towing vehicle; and
    decelerating the towed vehicle in response to a signal from the switch.

17. The method of claim 16, further comprising coupling the towing vehicle to the towed vehicle such that the towed vehicle is towable by the towing vehicle.

18. The method of claim 16, wherein decelerating the towed vehicle includes providing deceleration instructions to a towed vehicle brake system via a microprocessor.

19. The method of claim 16, wherein activating the switch with the actuator includes contacting a portion of the switch with one of the faces of the actuator.

20. A kit for a yaw control system kit couplable to a ball hitch system, which includes a first hitch assembly coupled to a towing vehicle and a second hitch assembly coupled to a towed vehicle, the kit comprising:
    a first brake system configured to decelerate the towed vehicle;

an actuator mountable to rotate with the towed vehicle, the actuator having a cutout region defined by at least two structural faces spatially separated by a yaw distance that corresponds to a yaw angle; and a switch mountable to the towing vehicle and positionable within the cutout region, the switch operable to communicate with the first brake system to decelerate the towed vehicle when a yaw rotation of the towed vehicle causes the actuator to move within a desired distance of the switch and thereby activate the switch.

21. The kit of claim 20, wherein the first hitch assembly of the towing vehicle includes a hitch ball.

22. The kit of claim 20, wherein the desired distance includes the actuator making contact with the switch.

23. The kit of claim 20, wherein the actuator includes a retractable rod positionable from the switch by the first gap.

* * * * *